(12) United States Patent
Ideyama

(10) Patent No.: US 6,813,385 B2
(45) Date of Patent: Nov. 2, 2004

(54) IMAGE DATA PROCESSING APPARATUS AND METHOD FOR EMBEDDING ADDITIONAL INFORMATION INTO IMAGE DATA, DATA PROCESSING APPARATUS AND METHOD, AND IMAGE FORMING APPARATUS

(75) Inventor: Hiriyuki Ideyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 607 days.

(21) Appl. No.: 09/826,807

(22) Filed: Apr. 6, 2001

(65) Prior Publication Data

US 2001/0030761 A1 Oct. 18, 2001

(51) Int. Cl.[7] .............................. G06K 9/46; G06K 1/00
(52) U.S. Cl. ..................... 382/232; 358/1.14; 358/3.28; 399/366
(58) Field of Search ................................ 382/100, 112, 382/232, 135; 358/1.13, 1.14, 1.9, 296, 3.28, 3.29; 380/50, 501, 54; 399/194, 366; 704/273; 713/176

(56) References Cited

U.S. PATENT DOCUMENTS

| | | | |
|---|---|---|---|
| 5,257,119 A | | 10/1993 | Funada et al. |
| 5,502,576 A | * | 3/1996 | Ramsay et al. ............. 358/444 |
| 5,530,759 A | * | 6/1996 | Braudaway et al. .......... 380/54 |
| 5,790,703 A | * | 8/1998 | Wang ......................... 358/3.28 |
| 5,832,119 A | * | 11/1998 | Rhoads ........................ 382/232 |
| 5,920,861 A | * | 7/1999 | Hall et al. ...................... 707/9 |
| 5,974,548 A | * | 10/1999 | Adams ....................... 713/200 |
| 6,252,963 B1 | * | 6/2001 | Rhoads .......................... 380/54 |
| 6,256,110 B1 | * | 7/2001 | Yoshitani .................... 358/1.9 |
| 6,285,776 B1 | * | 9/2001 | Rhoads ........................ 382/100 |

FOREIGN PATENT DOCUMENTS

| | | |
|---|---|---|
| JP | 10-304176 | 11/1998 |
| JP | 10-304177 | 11/1998 |
| JP | 11-122470 | 4/1999 |

* cited by examiner

Primary Examiner—Jayanti K. Patel
(74) Attorney, Agent, or Firm—Burns, Doane, Swecker & Mathis, L.L.P.

(57) ABSTRACT

An image data processing apparatus that selects, as an output destination of image data, either a printer or a personal computer in accordance with an instruction from an operator. When the printer is selected as the output destination, a first pattern composed of high-density dots that is less influenced by noise during an image forming process is embedded as the additional information into the image data. When the personal computer is selected as the output destination, a second pattern composed of low-density dots is embedded as the additional information into the image data. The image data containing the additional information is output to the selected output destination.

19 Claims, 8 Drawing Sheets

PATTERN2

(b)

PATTERN1

(a)

IMAGE DATA PROCESSING APPARATUS AND METHOD FOR EMBEDDING ADDITIONAL INFORMATION INTO IMAGE DATA, DATA PROCESSING APPARATUS AND METHOD, AND IMAGE FORMING APPARATUS

This application is based on an application No.2000-107936 filed in Japan, the content of which is hereby incorporated by reference.

BACKGROUND OF THE INVENTION (1) Field of the Invention

The present invention relates to an image data processing apparatus that embeds additional information into image data, and relates to an image forming apparatus that forms an image in accordance with the image data in which the additional information is embedded.

(2) Description of Related Art

Recently, digital copiers provided with an image processing apparatus that embeds "watermark" information into copied images formed on recording paper have been on the market (hereinafter the "watermark" information is referred to as additional information since the information is added to the image data). The additional information is used for copy management or security.

When images are copied by such copiers, noise such as splatters of toner particles is often attached to the formed images during the copying process. As a result, to prevent the additional information, which is represented by dots constituting a certain pattern, from being damaged by such noise, the density of the dots constituting the pattern is made relatively high.

Meanwhile, in offices or companies, such digital copiers are often connected to personal computers (hereinafter referred to as PCs) via networks, and, for example, the PCs are used to take in, via the networks, image data which has been scanned in by image reader units of the copiers and to display images on monitors of the PCs so that the images can be processed.

For the sake of security, the additional information is also embedded into the image data scanned in by the image reader units and transferred to the PCs. In doing this, conventionally, a pattern with high density is embedded into the image data, as is the case where images are formed on recording paper.

However, when patterns with as high density as patterns embedded in the images formed on recording paper are embedded into the image data, viewers (users) of monitors of PCs that receive and display the image data may recognize the embedded patterns on the displayed images. This makes the users feel deterioration in image quality or feel uncomfortable.

When the density of the dots of the patterns is decreased to prevent the above, the additional information embedded in images formed on recording paper may be damaged by noise. When this happens, the additional information may not be recognized when the copied images are scanned in by scanners or the like.

SUMMARY OF THE INVENTION

It is therefore an object of the present invention to provide image data processing apparatus and method that embeds additional information that is less influenced by noise, into an image formed on recording paper, and embeds additional information that is not uncomfortble for users, into an image to be displayed on monitors of PCs, data processing apparatus and method, and an image forming apparatus.

The above object is fulfilled by an image data processing apparatus comprising: an output destination selection unit which selects, as an output destination of image data, either a first reproduction apparatus or a second reproduction apparatus in accordance with an instruction from an operator, the first reproduction apparatus and the second reproduction apparatus reproducing the image data on different types of mediums; an embedding condition determining unit which determines an embedding condition in which additional information is embedded into the image data, in accordance with the selected output destination;

an additional information embedding unit which embeds the additional information into the image data in the determined embedding condition; and an image data output unit which outputs the image data containing the additional information to the selected output destination.

With the above construction, the image data processing apparatus determines the embedding condition in accordance with the output destination of the image data that is selected in accordance with an instruction from the operator. Here, suppose that the first reproduction apparatus is a printer that reproduces the image on recording paper (a reproduction medium) and that the second reproduction apparatus is a PC that reproduces the image on a monitor (another reproduction medium). In this case, the image data processing apparatus embeds a pattern composed of high-density dots that is less influenced by noise at printout, into an image printed out by the printer, and when the prited-out image is scanned in by a scanner or the like, the additional information (dot pattern) is properly recognized. Also, the image data processing apparatus embeds a pattern composed of low-density dots is not uncomfortble for users, into an image to be output to the PC. In this case, when the image is displayed on the monitor of the PC, it is difficult for human eyes to recognize the additional information and deterioration of the image quality.

The above object is also fulfilled by an image forming apparatus comprising: an image reader unit which reads an image from a source document and generates a piece of image data; a print unit which forms an image on a sheet of paper in accordance with the piece of image data received from an image data output unit; a communication control unit which outputs the piece of image data received from the image data output unit to an external apparatus; an output destination selection unit which selects, as an output destination of the piece of image data generated by the image reader unit, either the print unit or the communication control unit; an additional information generating unit which generates a different piece of additional information in accordance with the selected output destination; an additional information embedding unit which embeds the generated piece of additional information into the piece of image data generated by the image reader unit; and the image data output unit which outputs the piece of image data containing the piece of additional information to the selected output destination.

With the above construction, the image forming apparatus can embed a different piece of additional information into the image data generated by the image reader unit, in accordance with the selected output destination. For example, when the print unit is selected as the output destination, the image data processing apparatus embeds a pattern composed of high-density dots that is less influenced by noise during the image formation process. Also, when the communication control unit is selected as the output destination, the image data processing apparatus embeds, as the additional information, a pattern composed of dots that have lower density than the pattern for the print unit, into the image data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

The following is a description of an embodiment of the present invention in which an image data processing apparatus of the present invention is applied to a digital full-color copier (hereinafter referred to as only "copier"), which is connected to a network system.

Figure 1:
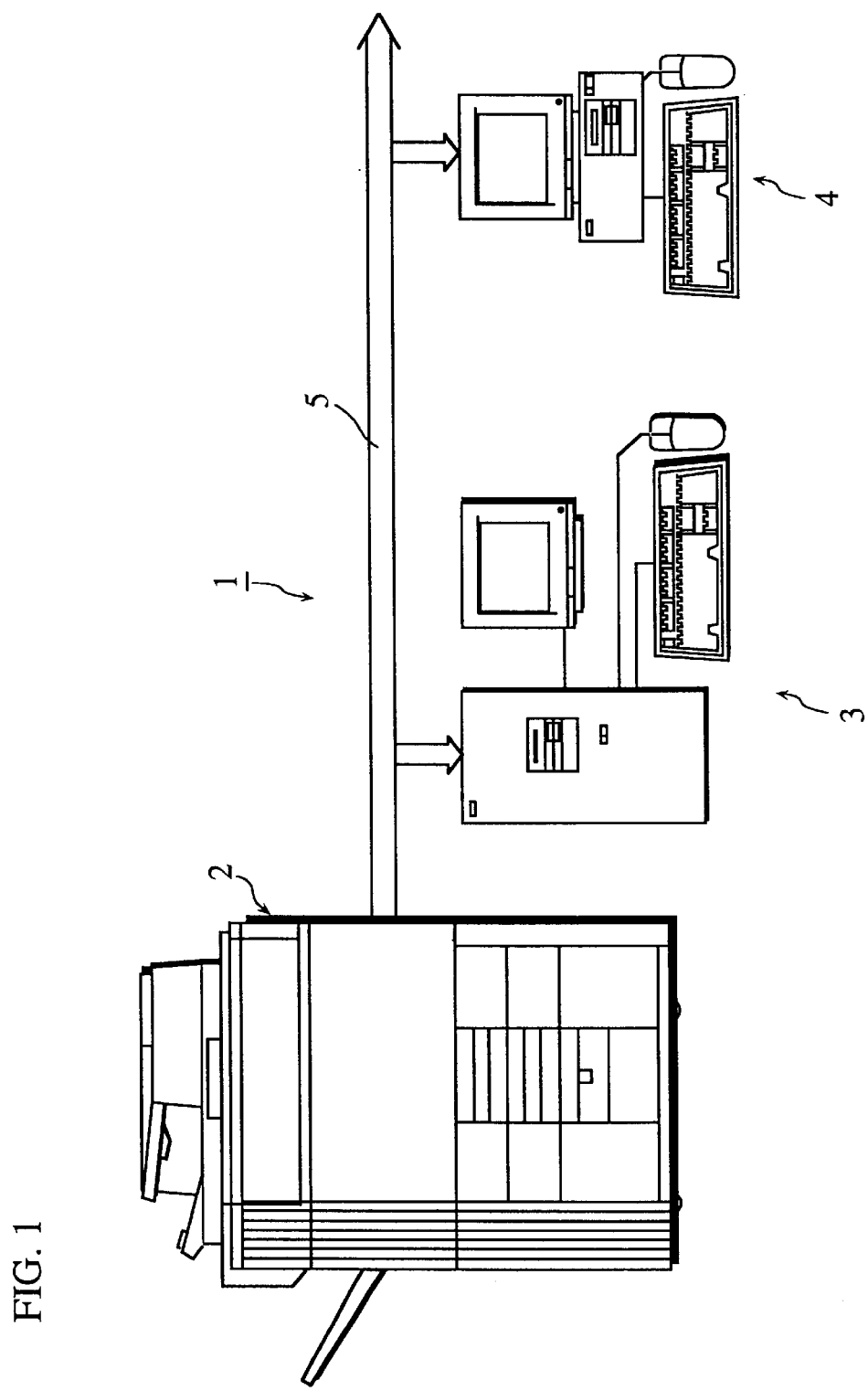
FIG. 1 shows the entire construction of a network system to which a copier having the image data processing apparatus of the present invention is connected.

FIG. 1 shows the entire construction of the network system 1.

As shown in FIG. 1, the network system 1 includes a copier 2, a PC (personal computer) 3 used as a server, a PC 4 used as a terminal, and a LAN (Local Area Network) 5 that connects the other components so that they can communicate with each other.

The PC 3 and PC 4 each include: a main unit having a hard disk or the like; a monitor and a keyboard connected to the main unit; an OS (Operating System) that is designed for the network and is stored in the hard disk beforehand; and applications such as image processing software or word processor software. The PC 3 and PC 4 can share an image reader unit 20 (see FIG. 2) and a printer unit 30 (see FIG. 2) included in the copier 2, using a sharing service provided by the OS. This enables a printer 30 of the copier 2 to print out a document which has been created by the PC 3 and transferred to the printer 30 via the LAN 5, or enables the PC 3 to take in, via the LAN 5, image data which has been scanned in by the image reader unit 20 of the copier 2. Unique IP addresses are assigned to the copier 2, PC 3, and PC 4 beforehand. An IP address is specified when a print job is requested or image data is transferred to a unit having the IP address.

Figure 2:
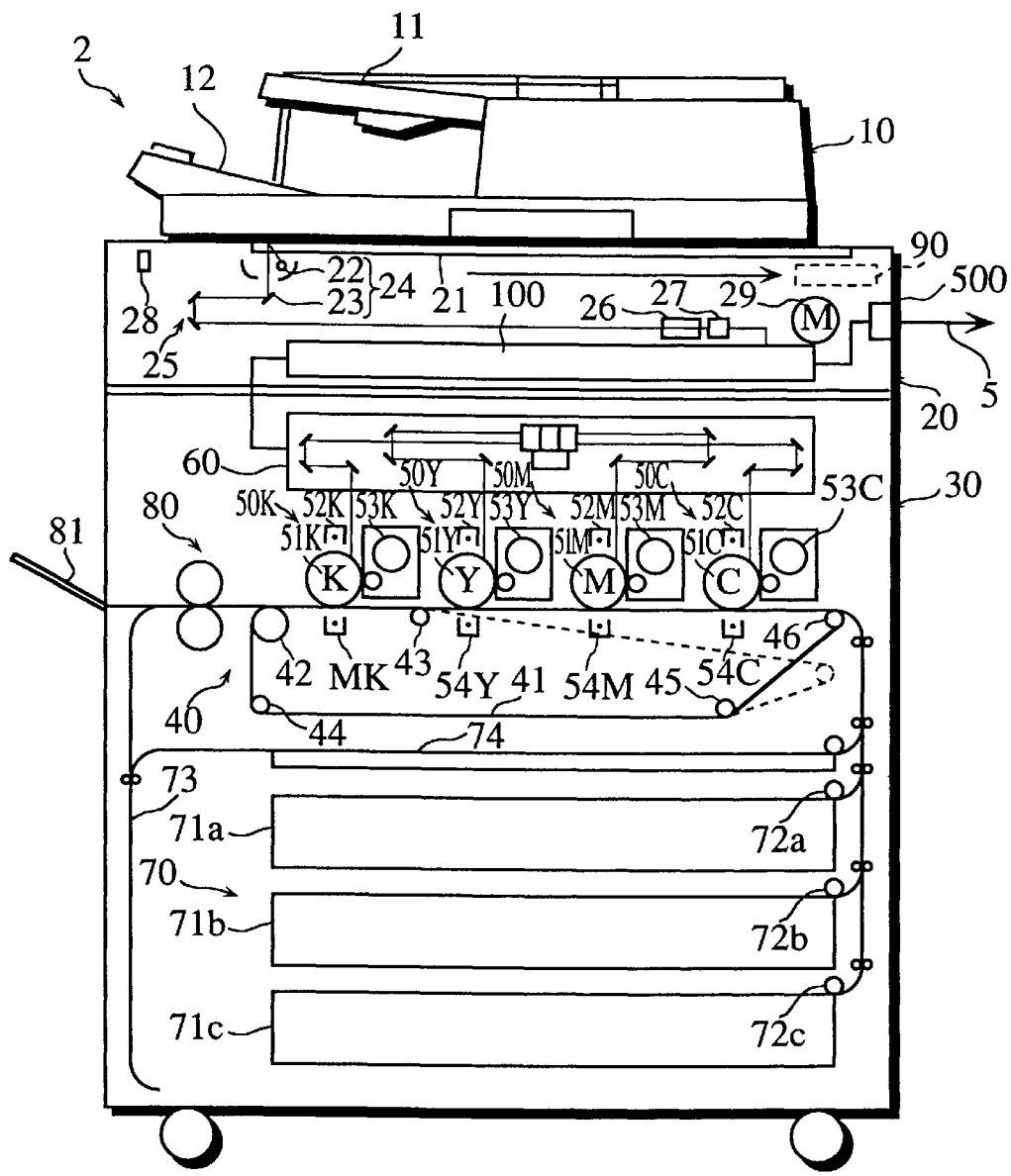
FIG. 2 shows the entire construction of the copier.

FIG. 2 shows the entire construction of the copier 2.

As shown in FIG. 2, the copier 2 is roughly composed of: an ADF (Automatic Document Feeder) 10, an image reader unit 20 that scans in an image and generates image data, and a printer unit 30 that outputs recording sheets on which image data received from the image reader unit 20 or an external apparatus such as the PC 4 via the LAN 5 is printed.

The ADF 10 is a known apparatus that includes a paper feeding tray 11 and a paper discharging tray 12 and feeds a plurality of sheets of paper set on the paper feeding tray 11 into a document scanning position on a platen glass 21 one by one, and after the image is scanned in from the sheet of paper, ejects the sheet of paper onto the paper discharging tray 12.

The image reader unit 20 includes: an exposure lamp 22 that emits light onto the paper set on the document scanning position on the platen glass 21; a first scanner 24 having a mirror 23 that reflects the light emitted from the exposure lamp 22 and guides the reflected light in a direction parallel to the platen glass 21; a second scanner 25 having a mirror that guides the reflected light to a condenser lens 26; and a linear full-color sensor (hereinafter referred to as CCD sensor) 27 that converts the light condensed by the condenser lens 26 into an electric signal.

After the ADF 10 transfers a sheet of paper onto the document scanning position on the platen glass 21, a scanner motor 29 drives the first scanner 24 to move in a direction indicated by an arrow in FIG. 2. This allows the paper on the platen glass 21 to be scanned. The second scanner 25 moves in the same direction as the first scanner 24 at half the speed of the first scanner 24, keeping a constant optical path length between the paper and the condenser lens 26.

The light emitted onto the image on the paper by the exposure lamp 22 of the first scanner 24 is reflected by mirrors and reaches the CCD sensor 27. The CCD sensor 27 converts the light into electric signals of red, green, and blue components, and sends the electric signals to a control unit 100 (hereinafter the red, green, and blue components are referred to as R, G, and B, respectively). The image data for each of R, G, and B is subjected to various corrections (e.g., shading correction) by the control unit 100 as will be described later. It is then judged whether a certain piece of additional information is included in the image data. If judged to be included, the additional information is extracted from the image data, and another additional information is embedded into the image data. More specifically, a different pattern of additional information is embedded into the image data, depending on which of an external apparatus (PC 3 or PC 4) and the printer unit 30 the image data is then transferred to. After a certain pattern of additional information is embedded, the image data is either transferred to the PC 3 or PC 4 via the LAN 5, or transferred to the printer unit 30. When the image data is to be transferred to the printer unit 30, the control unit 100 converts the image data into grey-scale data for each of the reproduction colors cyanogen, magenta, yellow, and black (hereinafter referred to as C, M, Y, and K, respectively). Then during the image forming process, the control unit 100 converts the image data for each color into a driving signal for a laser diode that corresponds to the color, and modulation-drives the corresponding laser diode in a printer head 60 according to the driving signal.

The printer unit 30 forms images by a known electrophotography, and includes: a sheet conveying unit 40 composed of a spanned conveying belt 41; image formation units 50C, 50M, 50Y, and 50K (respectively corresponding to C, M, Y, and K) that are arranged opposite to the conveying belt 41 in the order from the upstream to downstream of the sheet conveyance direction; the printer head 60 disposed above the image formation units 50C, 50M, 50Y, and 50K; a paper feed unit 70 disposed at a place upstream to the sheet conveying unit 40; and a fixing unit 80 that is disposed at a place downstream to the sheet conveying unit 40 and has a pair of fixing rollers.

The conveying belt 41 of the sheet conveying unit 40 is spanned on a plurality of rollers (a driving roller 42, trailing rollers 43–45, and a belt evacuation roller 46), and is driven to rotate at a predetermined system speed.

The image formation units 50C, 50M, 50Y, and 50K includes: photoconductor drums 51C, 51M, 51Y, and 51K; electrostatic chargers 52C, 52M, 52Y, and 52K; development units 53C, 53M, 53Y, and 53K; and transcription chargers 54C, 54M, 54Y, and 54K, respectively, where the units 52C–52K, 53C–53K, 53C–53K, and 54C–54K are arranged to surround the photoconductor drums 51C–51K, respectively.

The paper feed unit 70 includes: paper feed cassettes 71a, 71b, and 71c for holding recording paper; and pick-up rollers 72a, 72b, and 72c. A piece of recording paper is picked up by one of the pick-up rollers 72a–72c that corresponds to a selected paper feed cassette, and transferred to the conveying belt 41 by a conveying roller.

The printer head 60 includes: laser diodes corresponding to C, M, Y, and K; and a polygon mirror that deflects laser beams emitted by the laser diodes. The printer head 60 modulation-drives each laser diode according to driving signals sent from the control unit 100. The laser beam emitted from a laser diode is reflected by the polygon mirror and other mirrors to scan the surface of the photoconductor drums 51C–51K of the image formation units 50C–50K in a main scanning direction.

Before the above exposure to the laser beam, the photoconductor drums 51C–51K are cleaned with a cleaner which is not illustrated so that after the remaining toner is removed from the surface, the photoconductor drums 51C–51K are uniformly charged by the electrostatic chargers 52C–52K. When the photoconductor drums 51C–51K are exposed to the laser beam while being charged, electrostatic latent images are formed on the surface of the photoconductor drums 51C–51K.

Electrostatic latent images are developed by the development units 53C–53K, and toner images for C, M, Y, and K are formed on the surface of the photoconductor drums 51C–51K, respectively. The toner images are sequentially transferred onto the recording paper conveyed by the conveying belt 41.

The above toner image transcription for each color is executed with different timing so that the images of all the colors are transferred to the same position on the conveyed recording paper, in the direction from upstream to downstream.

The recording paper on which the toner image has been transferred is conveyed to the fixing unit 80 by the conveying belt 41, where the paper is pressed with heat so that toner particles melt and adhere to the surface of the paper to fix there. The recording paper is then ejected onto a discharge tray 81.

It should be noted here that the copier 2 can perform a two-sided copy in which images are formed on either sides of a sheet of recording paper. When the two-sided copy is specified, after an image is formed on one side of a sheet of recording paper, the recording paper is guided to a reversing unit 73. The reversing unit 73 reverses the recording paper and transfers it to a duplexing unit 74. The recording paper is then conveyed by the conveying belt 41 so that an image is formed on the reverse side of the recording paper.

When a monochrome image of black is formed, the belt evacuation roller 46 is pressed down to a position indicated by a short dashed line shown in FIG. 2 by a driving apparatus which is not illustrated, and the conveying belt 41 is kept away from the photoconductor drums 51C, 51M, and 51Y. With this construction, photoconductor drums for the colors other than black are stopped and wear and tear of the peripheral units are prevented when a monochrome image is formed.

A communication control unit 500 is also included in the image reader unit 20. The communication control unit 500 is an interface for connecting the control unit 100 to the LAN 5, and controls the communication between the control unit 100 and external apparatuses.

An operating panel 90 is formed on the front of the image reader unit 20 at a location convenient for user operations, as indicated by a short dashed line shown in FIG. 2.

Figure 3:
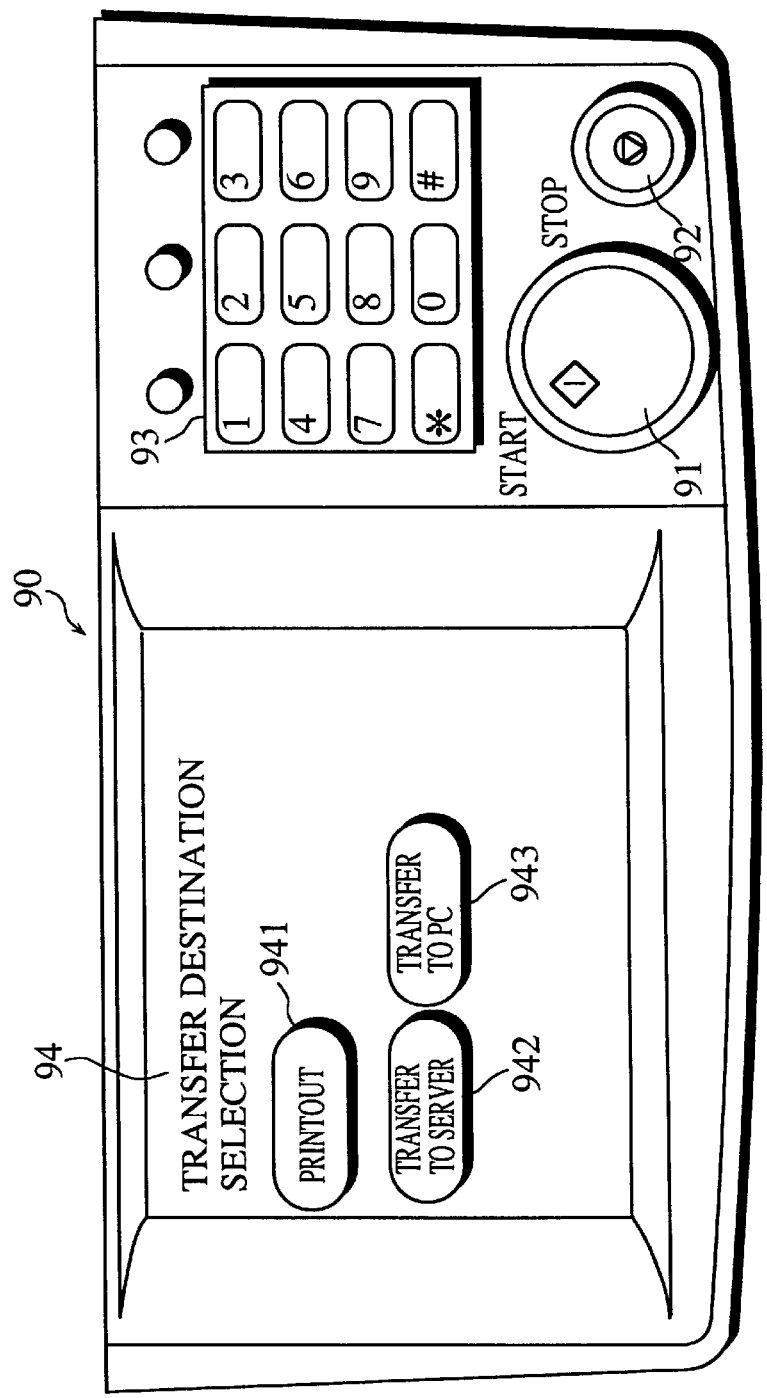
FIG. 3 shows the construction of an operating panel of the copier.

FIG. 3 shows the construction of the operating panel 90.

The operating panel 90 includes: a start key 91 used to start a copying operation; a stop key 92 used to stop the copying operation; ten keys 93; and a touch panel 94 which is used, on screen, to display the number of copies specified with the ten keys 93, to display a message for users, to enable the users to input various copy modes such as a two-sided copy mode, to enable the users to select an apparatus to which data of an image scanned in by the image reader unit 20 is to be transferred, etc.

In this example shown in FIG. 3, the touch panel displays the "transfer destination selection" screen. The user needs to select a transfer destination before the image reader unit 20 scans in an image on a sheet of paper. After the user selects, for example, a print output button 941 (by touching a corresponding portion on the screen with a finger), the image data scanned in by the image reader unit 20 is sent to the printer unit 30, and a print of the image data is output from the printer unit 30. After the user selects a server transfer button 942, the image data is sent to the PC 3 via the LAN 5. After the user selects a PC transfer button 943, the image data is sent to the PC 4.

Figure 4:
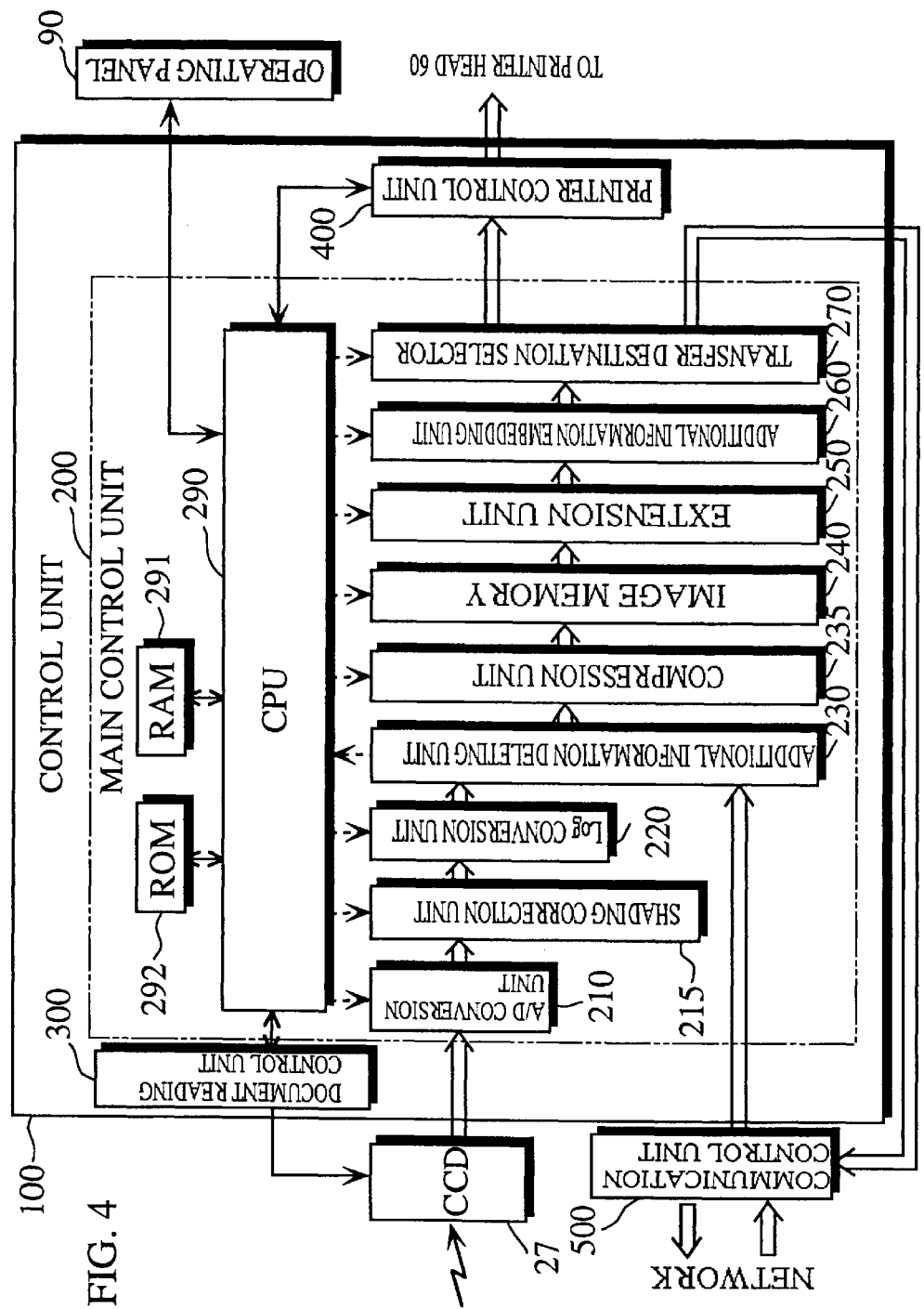
FIG. 4 is a block diagram showing the construction of a control unit of the copier.

FIG. 4 is a block diagram showing the construction of the control unit 100.

As shown in FIG. 4, the control unit 100 is roughly composed of a main control unit 200, a document reading control unit 300, and a printer control unit 400.

The document reading control unit 300 controls (a) the paper transferring operation by the ADF 10 and (b) the image reading operation by the image reader unit 20.

The printer control unit 400 achieves a smooth printing operation by controlling the printer unit 30.

The main control unit 200 includes a RAM 291, a ROM 292, a CPU 290, an A/D conversion unit 210, a shading correction unit 215, a log conversion unit 220, an additional information deleting unit 230, a compression unit 235, an image memory 240, an extension unit 250, an additional information embedding unit 260, and a transfer destination selector 270.

The ROM 292 stores a control program for the main control unit 200, initial values for various pieces of control data, and a control program relating to an additional information embedding process which will be described later.

The CPU 290 reads a necessary control program from the ROM 290, notifies the document reading control unit 300 and the printer control unit 400 of the operation timing for the image reader unit 20, the printer unit 30 or the like, and controls the copying operations coherently.

The CPU 290 also stores transfer destination information into the RAM 291, the transfer destination information being the image data transfer destination selected on the "transfer destination selection" screen displayed on the operating panel 90. The CPU 290 also determines which of two predetermined patterns should be embedded into image data, as additional information, and notifies the additional information embedding unit 260 of the selected pattern.

The RAM 291 temporarily stores the transfer destination information, and is also used as a work area during a program execution.

The A/D conversion unit 210 converts analog electric signals, which are sent from the CCD sensor 27 when the image reader unit 20 scans in an image on paper, into multi-value digital image data for each of R, G, and B.

The shading correction unit 215 performs a known shading correction onto the multi-value digital image data received from the A/D conversion unit 210.

The log conversion unit 220 converts the shading-corrected image data into a recording density signal since the shading-corrected image data is proportionate to the reflection rate (brightness) of the paper.

The additional information deleting unit 230 checks whether predetermined additional information is included in the image data. This is done, for example, by reading pixel blocks which are each composed of the predetermined number of pixels, from the image data, and checking whether the pixel blocks include a pattern of systematically changing density.

When detecting the pattern of systematically changing density, the additional information deleting unit 230 judges that the pattern of systematically changing density is the predetermined additional information, and deletes the pattern of systematically changing density. In this deletion process, for example, when it is found that white pixels are systematically disposed against a dark background, the pattern of the systematically disposed pixels is recognized, and the white pixels are replaced with pixels having the density of the adjacent pixels. After the additional information is deleted, the image data is sent to the compression unit 235. The meaning of the deleted additional information is sent to the CPU 290.

The compression unit 235, in accordance with an instruction from the CPU 290, compresses the image data for each of R, G, and B from, for example, 8 bits to several bits, and temporarily stores the compressed image data into the image memory 240.

The extension unit 250, when receiving an instruction from the CPU 290 to read image data, reads compressed image data from the image memory 240, extends the image data to the size before the compression (e.g., 8 bits), and sends the extended image data to the additional information embedding unit 260.

The additional information embedding unit 260, in accordance with an instruction from the CPU 290, embeds a different pattern of additional information into the image data, depending on which of an external apparatus (PC 3 or PC 4) and the printer unit 30 the image data is transferred to. This operation will be described in detail.

Figure 5:
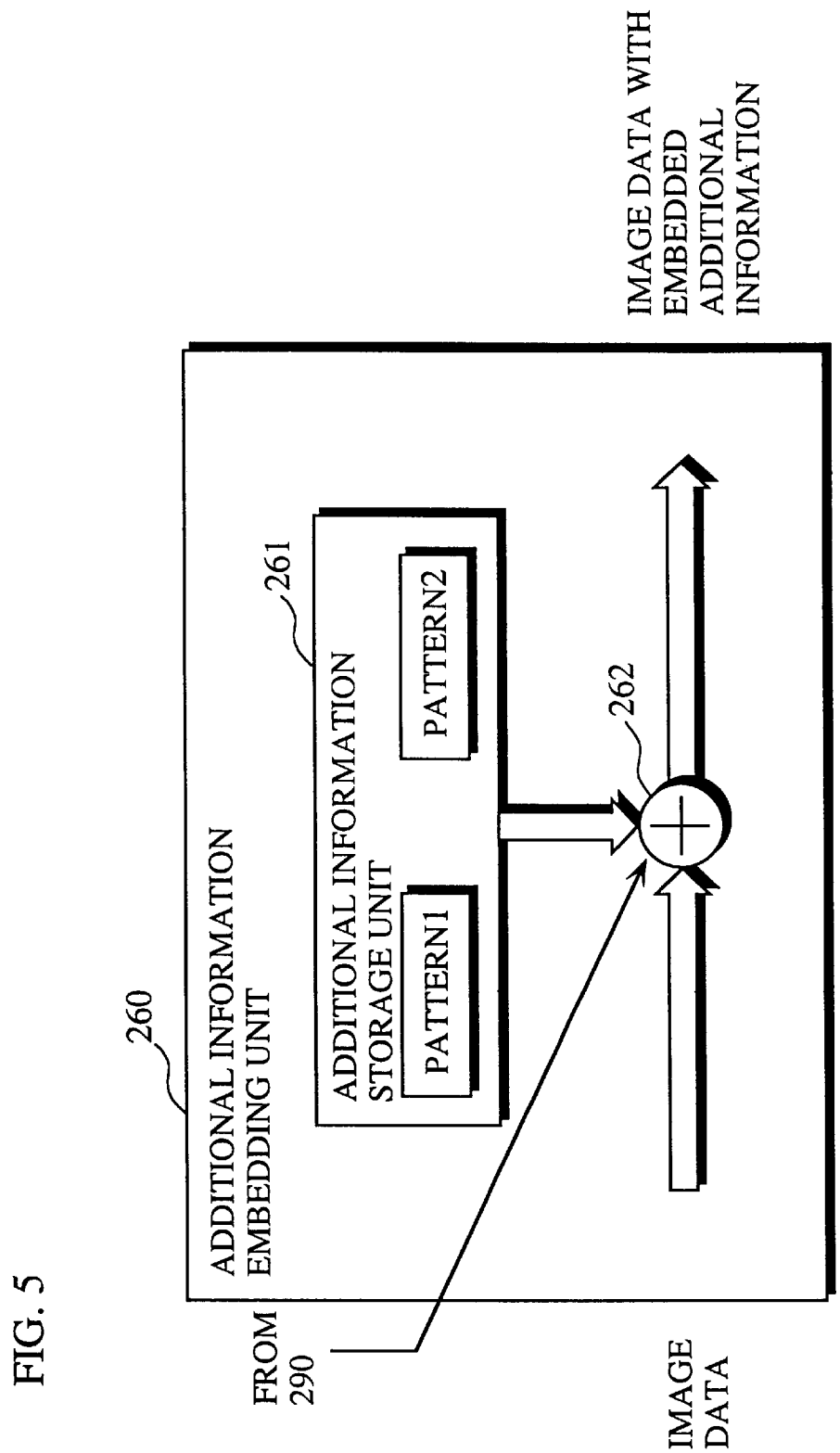
FIG. 5 is a block diagram showing the construction of an additional information embedding unit of the control unit.

FIG. 5 is a block diagram showing the construction of the additional information embedding unit 260.

As shown in FIG. 5, the additional information embedding unit 260 includes an additional information storage unit 261 and an embedding unit 262.

The additional information storage unit 261 is achieved by a ROM or the like and prestores a pattern 1 and a pattern 2 as additional information indicating apparatus numbers. Here, the apparatus numbers are uniquely assigned to apparatuses that embed additional information into images, as identification information. For example, when a scanner scans in an image from a sheet of printed-out recording paper, and an apparatus number is detected from the image, the apparatus that has embedded the additional information is identified by the apparatus number.

Figure 6:
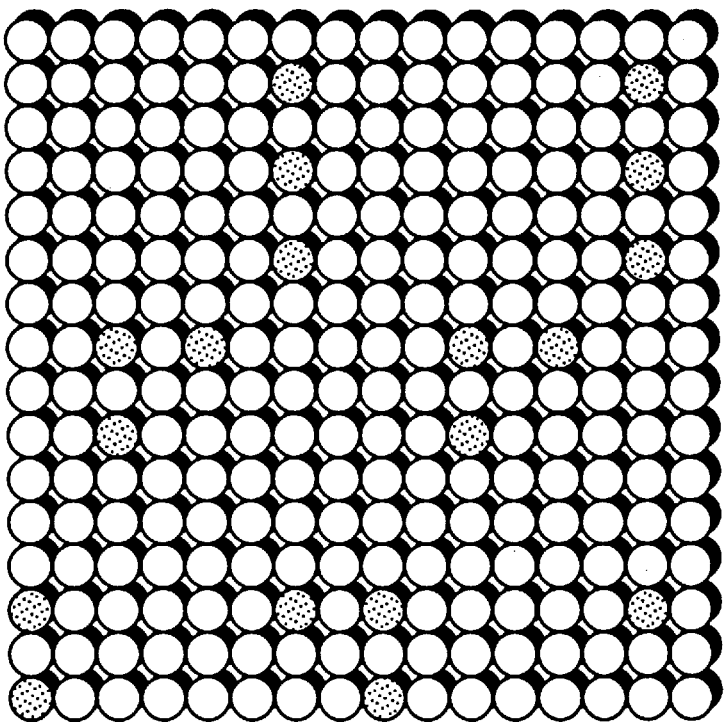
FIGS. 6A and 6B show examples of the patterns used as additional information.
Figure 6:
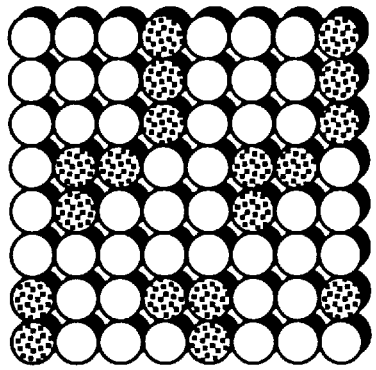

FIGS. 6A and 6B show the patterns 1 and 2.

As shown in FIG. 6A, the pattern 1 shown in FIG. 6A is a block of 8×8 dots, and the pattern 2 shown in FIG. 6B is a block of 16×16 dots. The patterns 1 and 2 include different patterns that are formed by dots having higher density than the background dots. Hereinafter, the high-density dots that constitute the pattern are referred to as pattern dots. As apparent from a comparison between the patterns 1 and 2, the density of the pattern dots of the pattern 1 is higher than the pattern 2, and the pattern 2 has wider intervals between the pattern dots (and therefore larger area) than the pattern 1.

As described above, two different patterns are prepared for one type of information (in this example, apparatus numbers). As will be described in detail later, the pattern 1 is used as the additional information for the case where the image data is transferred to the printer, and the pattern 2 is used for the case where the image data is transferred to an external apparatus.

It is presumed in the present embodiment that only the patterns 1 and 2 are embedded in image data as additional information.

When judging by referring to the transfer destination information in the RAM 291 that the user has selected a printout, the CPU 290 instructs the embedding unit 262 to embed the pattern 1 into the image data as additional information since the image data should be transferred to the printer unit 30.

The embedding unit 262 reads the pattern 1 from the additional information storage unit 261 and embeds a plurality of the patterns 1 into a certain portion of the image data.

The reason why the pattern 1 is embedded in image data for a printout is as follows. When the image data is printed out, noise such as splatters of toner particles is often attached to the image during the image forming process. In this case, a pattern dot with high density is less damaged by the noise than a pattern dot with low density. Also, when the image data having the additional information is scanned in by a scanner (or the image reader unit 20 of the copier 2), the additional information is recognized more steadily with the pattern 1 than with the pattern 2. Also, when the density of the pattern dots is low, a scanning-in error may happen more frequently than when the density is high. Therefore, the pattern 1 with high-density pattern dots is more accurately recognized than the pattern 2 in the case of printout.

The pattern 1 has a smaller area of a pattern unit than the pattern 2. As a result, when the image with the pattern 1 is partially damaged by a noise or a defect (a perfect destruction or an extremely low density of the image portion) during the printout, there is a higher probability that an entire pattern is damaged. In this case, the influence of the damage is smaller than the case where the pattern is partially damaged. In the present embodiment, a plurality of the patterns 1 are embedded into a certain portion of the image data, taking the above probability into account.

The density, interval, and the number of the pattern dots are determined beforehand, taking the influence of noise or the like during image formation into consideration.

In the present embodiment, the pattern 1 is embedded into image data for the color R. This is because the color R has higher saturation than G or B and that when an image on a printed-out sheet of recording paper is scanned in by a scanner, the additional information embedded in image data for R is more easily recognized than the other colors, decreasing the effects of scanning errors by a scanner or the like.

When judging by referring to the transfer destination information that the user has selected a transfer to an external apparatus such as a server, the CPU 290 instructs the embedding unit 262 to embed the pattern 2 into the image data as additional information.

The embedding unit 262 reads the pattern 2 from the additional information storage unit 261 and embeds it into the image data. This is because in the case of a transfer to an external apparatus, there is no fear that the image data is damaged by a noise or a defect as in the case of a printout, and that even if the additional information has a low density and a large area, the information is certainly detected. This provides an effect that the user less feels image quality deterioration than conventional methods since it is more difficult for a user to recognize the pattern dots since the pattern dots are faint due to its low density and are dispersed on a monitor screen of a PC or the like. Also, there is no need of embedding a plurality of patterns 2 as is the case with the pattern 1, but only one pattern is embedded. This indicates that the deterioration of the image quality caused by the embedding is decreased, compared to the case where a plurality of patterns are embedded.

The density and interval of the pattern dots of the pattern 2 are determined beforehand so that when the imaged data with the pattern 2 is displayed on a monitor of a PC, it is difficult for human eyes to recognize the pattern.

The pattern 2 is embedded into image data for the color B. This is because the human perception characteristics are weak for B, and that it is more difficult for human eyes to percept the pattern embedded in B than in the other colors.

The patterns 1 and 2 are embedded into a portion of image data that is unimportant in terms of human perception, for example, in the case of a portrait, in his/her hair or the outline.

When the additional information deleting unit 230 detects a piece of additional information, the CPU 290 instructs the additional information embedding unit 260 to embed the detected piece of additional information into a predetermined position of the image data.

Back to FIG. 4, the additional information embedding unit 260 transmits the image data including additional information of an apparatus number to the transfer destination selector 270.

Upon receipt of a printout instruction from the CPU 290, the transfer destination selector 270 transfers the image data sent from the additional information embedding unit 260 to the printer control unit 400.

The printer control unit 400 performs known correction processes such as the UCR (Under Color Removal) process or the MTF correction onto image data received from the transfer destination selector 270, generates image data for each of the reproduction colors C, M, Y, and K, generates driving signals for modulation-driving laser diodes in the print head 60 in accordance with the generated image data, and sends the generated driving signals to the printer head 60 to allow the printer head 60 to form on a sheet of recording paper an image in which the pattern 1 is embedded.

When receiving from the CPU 290 an instruction to transfer to an external apparatus, the transfer destination selector 270 transfers the image data sent from the additional information embedding unit 260 to the communication control unit 500. The communication control unit 500 transfers the image data sent from the transfer destination selector 270 to an external apparatus (e.g., PC 4) specified by the CPU 290, via the LAN 5.

When receiving a print job request from an external apparatus, the communication control unit 500 transfers image data sent from the external apparatus to the additional information deleting unit 230. As is the case where the additional information deleting unit 230 receives image data from the log conversion unit 220, the additional information deleting unit 230 checks whether predetermined additional information is included in the image data. After confirming that the predetermined additional information is included in the image data, the additional information deleting unit 230 deletes the additional information, sends the image data to the compression unit 235, and notifies the CPU 290 of the meaning of the deleted additional information. As described above, the CPU 290 instructs the embedding unit 262 to embed the pattern 1 into the image data as additional information, and transfer the image data to the printer control unit 400.

Now, the main routine of the main control unit 200 will be described with reference to the flow chart shown in FIG. 7.

After the copier 2 is powered on, the CPU 290 initializes the RAM 291, image memory 240 and the like in step S1, and starts an internal timer in step S2. The CPU 290 then receives a user input such as a transfer destination selected by the user on the operating panel 90 (step S3). Note that a selected transfer destination may be input to the control unit 100 via the LAN 5 from an external apparatus, as well as from the operating panel 90. The transfer destination is temporarily stored in the RAM 291 as transfer destination information. The CPU 290 determines an apparatus to which the image data should be transferred, by referring to the transfer destination information stored in the RAM 291.

When additional information is embedded in the image data that has been scanned in by the image reader unit 20 or has been received from an external apparatus via the communication control unit 500, the additional information deleting unit 230 deletes the additional information from the image data, and stores the image data in the image memory 240 (step S4).

The CPU 290 judges which of the patterns 1 and 2 should be embedded into the image data by referring to the transfer destination information, reads the image data from the image memory 240, and embeds the selected pattern into the image data (step S5). The image data in which the additional information is embedded is transferred to the transfer destination indicated by the transfer destination information (step S6). Other necessary operations are performed (step S7). When the internal timer reaches a given value, control returns to step S2 (step S8).

Figure 7:
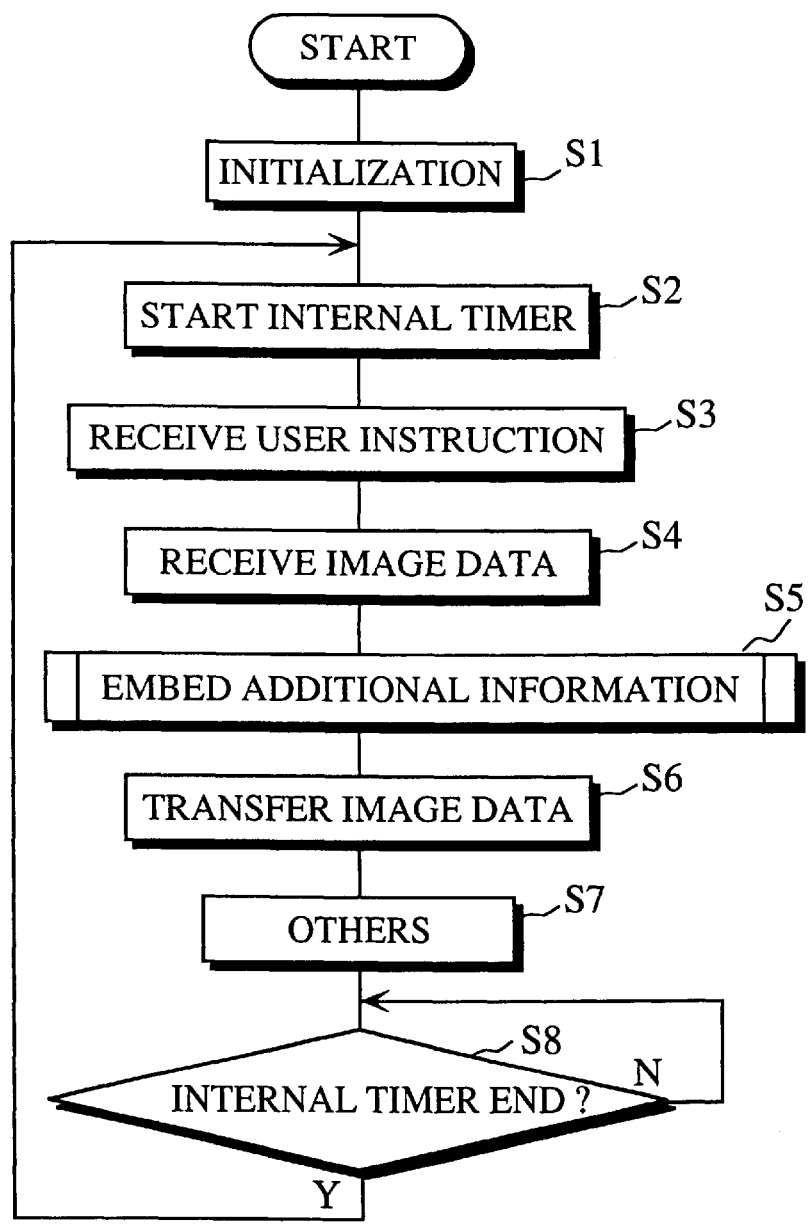
FIG. 7 is a flowchart of a main routine of the control exercised by the control unit.
Figure 8:
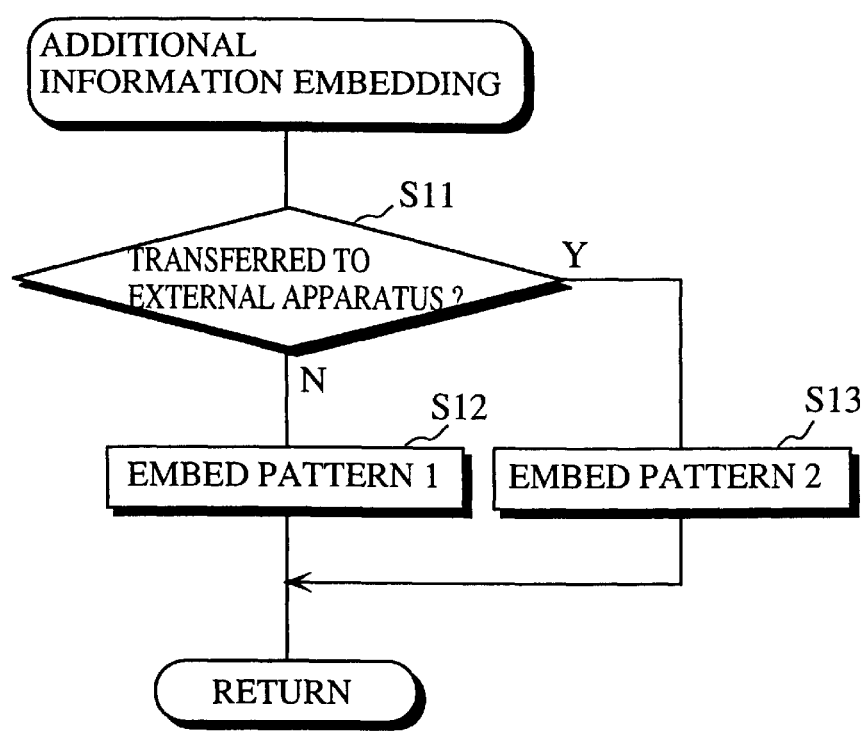
FIG. 8 is a flowchart of a subroutine in which the additional information embedding process in step S5 of the main routine shown in FIG. 7 is performed.

FIG. 8 is a flowchart of a subroutine in which the additional information embedding process in step S5 of the main routine shown in FIG. 7 is performed.

The CPU 290 judges whether the transfer destination of the image data is an external apparatus by referring to the transfer destination information in the RAM 291 (step S11).

When judging that the transfer destination is not an external apparatus, but the printer unit 30 (judged as "N" in step S11), the CPU 290 instructs the additional information embedding unit 260 to embed the pattern 1 into the image data (step S12).

When judging that the transfer destination is an external apparatus (judged as "Y" in step S11), the CPU 290 instructs the additional information embedding unit 260 to embed the pattern 2 into the image data (step S13). Control then moves to step S6 of the main routine shown in FIG. 7.

As described above, the image data processing apparatus of the present embodiment embeds selectively the pattern 1 or 2 as the additional information indicating an apparatus number, in accordance with the transfer destination, where the pattern 1 is for the case where the image data is printed out, and the pattern 2 is for the case where the image data is transferred to an external apparatus. When the image data is to be printed out, it is presumed that the image data may be damaged by noise during the image forming process, and the patten 1, which is less affected by noise, is embedded in the image data. With this arrangement, a reading apparatus such as a scanner can read the image data, properly recognizing the embedded additional information.

In the present embodiment, the pattern 1 is embedded into image data for the color R which has higher saturation than G or B. With this arrangement, when the image on a printed-out sheet of recording paper is scanned in by a scanner or the like, the additional information embedded in the image data is more easily recognized than the other colors.

When the image data is to be transfrerred to an external apparatus, the pattern 2, which has lower pattern dot density and wider intervals between the pattern dots than the pattern 1, is embedded in the image data since in such data transfers, there is no fear that the image data is damaged by a noise or a defect as in the case of a printout. With this arrangement, when the imaged data with the pattern 2 is displayed on a monitor of a PC, it is difficult for human eyes to recognize the additional information. This prevents the user from recognizing deterioration of the image quality. Also, the pattern 2 is embedded into image data for the color B for which the human perception characteristics are weak. With this arrangement, it is more difficult for human eyes to percept the embedded additional information. This prevents the user from feeling abnormality.

Up to now, the image data processing apparatus of the present invention has been described through its embodiment. However, the present invention is not limited to the above embodiment, and the following variations are also applicable.

(1) In the above embodiment, the density and interval of the pattern dots, and a color in which the additional information should be embedded are determined in accordance with the image data transfer destination. However, only one or two of the above three conditions may be used to obtain the effects to some extent.

Only the density of the pattern dots may be changed (and the pattern dot interval or the pattern area is not changed), for example. In this case, when the density of the pattern dots is high, the image on a sheet of printed out paper is less affected by noise; and when the density of the pattern dots is low, it is difficult for human eyes to recognize the additional information in the image displayed on a monitor of a PC, preventing the user from recognizing deterioration of the image quality.

Similarly, when only the interval between the pattern dots is changed (and the density of the pattern dots is not changed), the narrower the interval is, the smaller the pattern area is. It is therefore possible to make images resistant to damages such as a partial image defect by narrowing the interval. Also, when the image data is transferred to an external apparatus, the interval may be widened to disperse the pattern dots since there is no need of considering such damages in printout. With this arrangement, it is more difficult for human eyes to percept the embedded additional information.

In the above embodiment, the area of the pattern 2 is four times that of the pattern 1. However, the size of the patterns is not limited to this in so far a similar effect can be obtained. For example, the area of one pattern may be ten times or one hundred times that of the other pattern.

(2) In the above embodiment, an apparatus number is embedded in the image data as the additional information. However, the additional information is not limited to this. Other information, for example, information indicating that printout is prohibited may be embedded.

(3) In the above embodiment, the pattern dots of the patterns 1 and 2 are disposed against a low-density background. However, low-density pattern dots may be disposed against a high-density background, for example.

(4) In the above embodiment, a PC is connected as an external apparatus. However, the image data may be transferred to a printer connected to the apparatus. In this case, when the user selects the printer as a transfer destination on the operating panel, the apparatus embeds the pattern 1 into the image data and transfers the image data to the printer.

(5) The additional information may be encoded before it is embedded into image data.

Alternatively, the original image data may be divided into frequency components by FFT (Fast Fourier Transform), then the additional information may be embedded into the frequency components.

Also, in the above embodiment, the additional information is embedded into image data. However, the additional information may be embedded into audio data, for example.

Now, there are, for example, two cases in which the additional information is embedded in audio data: a first recording apparatus that receives digital audio data and records it onto a recording medium such as a compact disc; and a second recording apparatus that receives digital audio data, converts it into analog data, and records it onto a recording medium such as a cassette tape. In the case of the first recording apparatus, it is possible that the additional information is embedded with an acceptable level of deterioration of sound quality and that the additional information is properly recognized when the audio data is reproduced by a reproduction apparatus.

In the case of the second recording apparatus, however, the additional information may be removed when the data is converted into analog data. To prevent this, for example, the amount of information to be embedded is increased. In this case, though the sound quality is more deteriorated as the amount of embedded additional information increases, the additional information is more properly recognized when the recorded audio data is reproduced by a reproduction apparatus.

The present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image data processing apparatus comprising:
an output destination selection unit which selects, as an output destination of image data, either a first reproduction apparatus or a second reproduction apparatus in accordance with an instruction from an operator, the first reproduction apparatus and the second reproduction apparatus reproducing the image data on different types of mediums;

an embedding condition determining unit which determines an embedding condition in which additional information is embedded into the image data, in accordance with the selected output destination;

an additional information embedding unit which embeds the additional information into the image data in the determined embedding condition; and an image data output unit which outputs the image data containing the additional information to the selected output destination.

2. The image data processing apparatus of claim 1, wherein
the embedding condition is density of dots constituting a pattern to be embedded as the additional information.

3. The image data processing apparatus of claim 1, wherein
the embedding condition is intervals between dots constituting a pattern to be embedded as the additional information.

4. The image data processing apparatus of claim 1, wherein
the embedding condition is a color of dots constituting a pattern to be embedded as the additional information.

5. An image data processing method comprising:
an output destination selection step in which either a first reproduction apparatus or a second reproduction apparatus is selected as an output destination of image data, in accordance with an instruction from an operator, the first reproduction apparatus and the second reproduction apparatus reproducing the image data on different types of mediums;

an embedding condition determining step in which an embedding condition in which additional information is embedded into the image data is determined in accordance with the selected output destination;

an additional information embedding step in which the additional information is embedded into the image data in the determined embedding condition; and an image data output step in which the image data containing the additional information is output to the selected output destination.

6. The image data processing method of claim 5, wherein
the embedding condition is density of dots constituting a pattern to be embedded as the additional information.

7. The image data processing method of claim 5, wherein
the embedding condition is intervals between dots constituting a pattern to be embedded as the additional information.

8. The image data processing method of claim 5, wherein
the embedding condition is a color of dots constituting a pattern to be embedded as the additional information.

9. An image data processing apparatus comprising:
an output destination selection unit which selects an output destination of image data;
an additional information generating unit which generates a different piece of additional information in accordance with the selected output destination;
an additional information embedding unit which embeds the generated piece of additional information into the image data; and
an image data output unit which outputs the image data containing the generated piece of additional information to the selected output destination.

10. The image data processing apparatus of claim 9, wherein
the additional information generating unit includes:
an additional information storage unit which prestores a plurality of pieces of additional information; and
an additional information reading unit which reads one among the plurality of pieces of additional information from the additional information storage unit, in accordance with the selected output destination.

11. The image data processing apparatus of claim 9, wherein
each piece of additional information is represented by a pattern composed of a plurality of pattern dots.

12. The image data processing apparatus of claim 11, wherein
the additional information generating unit includes:
an additional information storage unit which prestores a plurality of patterns; and
an additional information reading unit which reads one among the plurality patterns from the additional information storage unit, in accordance with the selected output destination.

13. The image data processing apparatus of claim 11, wherein
the additional information generating unit generates a pattern that is different in density of the pattern dots, in accordance with the selected output destination.

14. The image data processing apparatus of claim 11, wherein
the additional information generating unit generates a pattern that is different in interval between the pattern dots, in accordance with the selected output destination.

15. The image data processing apparatus of claim 11, wherein
the additional information generating unit generates a pattern that is different in color of the pattern dots, in accordance with the selected output destination.

16. An image data processing method comprising:
an output destination selection step in which an output destination of image data is selected;
an additional information generating step in which a different piece of additional information is generated in accordance with the selected output destination;
an additional information embedding step in which the generated piece of additional information is embedded into the image data; and
an image data output step in which the image data containing the generated piece of additional information is output to the selected output destination.

17. An image forming apparatus comprising:
an image reader unit which reads an image from a source document and generates a piece of image data;
a print unit which forms an image on a sheet of paper in accordance with the piece of image data received from an image data output unit;
a communication control unit which outputs the piece of image data received from the image data output unit to an external apparatus;
an output destination selection unit which selects, as an output destination of the piece of image data generated by the image reader unit, either the print unit or the communication control unit;
an additional information generating unit which generates a different piece of additional information in accordance with the selected output destination;

an additional information embedding unit which embeds the generated piece of additional information into the piece of image data generated by the image reader unit; and the image data output unit which outputs the piece of image data containing the piece of additional information to the selected output destination.

18. A data processing apparatus comprising:

an output destination selection unit which selects an output destination of data;

an additional information generating unit which generates a different piece of additional information in accordance with the selected output destination;

an additional information embedding unit which embeds the generated piece of additional information into the data; and a data output unit which outputs the data containing the piece of additional information to the selected output destination.

19. A data processing method comprising:

an output destination selection step in which an output destination of data is selected;

an additional information generating step in which a different piece of additional information is generated in accordance with the selected output destination;

an additional information embedding step in which the generated piece of additional information is embedded into the data; and a data output step in which the data containing the piece of additional information is output to the selected output destination.

* * * * *